United States Patent
Muramatsu (10) Patent No.: US 8,433,097 B2
(45) Date of Patent: Apr. 30, 2013

(54) SUBJECT TRACKING DEVICE, SUBJECT TRACKING METHOD, SUBJECT TRACKING PROGRAM PRODUCT AND OPTICAL DEVICE

(75) Inventor: Keiko Muramatsu, Tachikawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/316,686

(22) Filed: Dec. 12, 2011

(65) Prior Publication Data

US 2012/0087544 A1 Apr. 12, 2012

Related U.S. Application Data

(63) Continuation of application No. 11/701,360, filed on Feb. 2, 2007, now abandoned.

(30) Foreign Application Priority Data

Mar. 15, 2006 (JP) .................................. 2006070654
Jan. 31, 2007 (JP) .................................. 2007020336

(51) Int. Cl.
*G06K 9/00* (2006.01)

(52) U.S. Cl.
USPC .......................................... 382/103; 348/345

(58) Field of Classification Search .................. 382/103; 348/345
See application file for complete search history.

(56) References Cited

U.S. PATENT DOCUMENTS

| 5,196,929 | A | 3/1993 | Miyasaka |
| 5,319,412 | A * | 6/1994 | Hamada et al. ................. 396/95 |
| 5,418,595 | A | 5/1995 | Iwasaki et al. |
| 5,627,586 | A | 5/1997 | Yamasaki |
| 5,896,174 | A | 4/1999 | Nakata |
| 6,112,029 | A * | 8/2000 | Suda ............................... 396/92 |
| 7,315,631 | B1 | 1/2008 | Corcoran et al. |
| 7,561,748 | B2 * | 7/2009 | Suzuki ........................... 382/232 |
| 7,769,285 | B2 * | 8/2010 | Honjo et al. ................... 396/101 |
| 7,899,208 | B2 * | 3/2011 | Kondo et al. .................. 382/103 |
| 2005/0264679 | A1 | 12/2005 | Sasaki et al. |

FOREIGN PATENT DOCUMENTS

| JP | A-01-120178 | 5/1989 |
| JP | A-05-080248 | 4/1993 |
| JP | A-05-145822 | 6/1993 |
| JP | A-05-288982 | 11/1993 |
| JP | A-07-110429 | 4/1995 |
| JP | A-08-029674 | 2/1996 |
| JP | A-2003-097914 | 4/2003 |

OTHER PUBLICATIONS

Jul. 12, 2011 Office Action issued in Japanese Patent Application No. 2007-020336 (with English translation).
Jun. 7, 2010 Office Action issued in U.S. Appl. No. 11/701,360.
Mar. 2, 2011 Office Action issued in U.S. Appl. No. 11/701,360.
Sep. 12, 2011 Notice of Allowance issued in U.S. Appl. No. 11/701,360.
Mar. 21, 2012 Office Action issued in Japanese Patent Application No. 2007-020336 w/translation.

* cited by examiner

*Primary Examiner* — Tom Y Lu
(74) *Attorney, Agent, or Firm* — Oliff & Berridge, PLC (57) ABSTRACT

A subject tracking device includes: a tracking zone setting unit that sets an area where a main subject is present within a captured image as a tracking zone; a tracking unit that tracks the main subject based upon an image output corresponding to the tracking zone; and an arithmetic operation unit that determines through arithmetic operation image-capturing conditions based upon an image output corresponding to a central area within the tracking zone.

21 Claims, 8 Drawing Sheets

40: FOCUS DETECTION AREA
41: TRACKING ZONE
43: TRACKING CALCULATION ZONE
44: IMAGE

SUBJECT TRACKING DEVICE, SUBJECT TRACKING METHOD, SUBJECT TRACKING PROGRAM PRODUCT AND OPTICAL DEVICE

CROSS-REFERENCE TO RELATED APPLICATION

This application is a continuation of U.S. patent application Ser. No. 11/701,360 filed Feb. 2, 2007, the disclosure of which is herein incorporated in its entirety.

INCORPORATION BY REFERENCE

The disclosures of the following priority applications are herein incorporated by reference:
Japanese Patent Application No. 2006-070654 filed Mar. 15, 2006
Japanese Patent Application No. 2007-020336 filed Jan. 31, 2007

BACKGROUND OF THE INVENTION

1. Field of the Invention

The present invention relates to a subject tracking device, a subject tracking method, a subject tracking program product and an optical device, to be adopted when automatically tracking a subject that moves within an imaging field.

2. Description of the Related Art

There are cameras known in the related art that execute focus detection and exposure calculation by automatically tracking a moving subject being photographed. In such a camera disclosed in the related art, a wide area around the point at which the photographer's eyes are set is selected as a moving object detection zone while tracking the photographic subject, the moving object detection zone is then divided into a plurality of areas and the area where the photographic subject is present or the area with the highest contrast among the divided areas is detected as a tracking zone (see, for instance, Japanese Laid Open Patent Publication No. H05-288982).

SUMMARY OF THE INVENTION

While the tracking reliability achieved with the camera in the related art is low if the tracking zone is small, the camera effectively tracks the photographic subject over a large tracking zone with better reliability. However, since the volume of information sampled over the large tracking zone is bound to be large, the load of processing executed for the focus detection and the exposure calculation for the photographic subject, too, increases.

According to the 1st embodiment of the present invention, a subject tracking device comprises: a tracking zone setting unit that sets an area where a main subject is present within a captured image as a tracking zone; a tracking unit that tracks the main subject based upon an image output corresponding to the tracking zone; and an arithmetic operation unit that determines through arithmetic operation image-capturing conditions based upon an image output corresponding to a central area within the tracking zone.

According to the 2nd embodiment of the present invention, in the subject tracking device according to the 1st embodiment, it is preferred that: there is further provided a converting unit that converts a captured image data to be reduced and outputs a converted image data; and the tracking unit tracks movement of the main subject by using the converted image data.

According to the 3rd embodiment of the present invention, in the subject tracking device according to the 1st embodiment, it is preferred that the tracking zone setting unit sets an area corresponding to a subject present at a center of the captured image as the tracking zone.

According to the 4th embodiment of the present invention, in the subject tracking device according to the 1st embodiment, it is preferred that there is further provided a display unit that displays within the captured image a mark indicating an area corresponding to an area constituting part of the tracking zone.

According to the 5th embodiment of the present invention, an optical device comprises a subject tracking device according to the 1st embodiment.

According to the 6th embodiment of the present invention, in the optical device according to the 5th embodiment, it is preferred that: the subject tracking device further comprises a display unit that displays within the captured image a mark indicating an area corresponding to an area constituting part of the tracking zone; a focus detection area indicating a position at which focus detection is executed for the subject is set in the captured image; and the mark indicates the focus detection area present within the tracking zone.

According to the 7th embodiment of the present invention, in the optical device according to the 6th embodiment, it is preferred that the tracking zone setting unit sets an area corresponding to the focus detection area having been selected as the tracking zone.

According to the 8th embodiment of the present invention, a subject tracking method comprises: setting an area where a main subject is present within a captured image as a tracking zone; tracking the main subject based upon an image output corresponding to the tracking zone; and determining through arithmetic operation image-capturing conditions based upon an image output corresponding to a central area within the tracking zone.

According to the 9th embodiment of the present invention, a computer-readable computer program product having contained therein a subject tracking program, and the subject tracking program comprises: processing for tracking a main subject based upon an image output corresponding to a tracking zone; and processing for determining through arithmetic operation image-capturing conditions based upon an image output corresponding to a central area within the tracking zone.

According to the 10th embodiment of the present invention, a subject tracking device comprises: a tracking unit that designates image data in an area where a subject is present within a first image as a first tracking zone and tracks the subject by designating an area where image data corresponding to the image data in the first tracking zone are present in a second image obtained after the first image as a second tracking zone; and an arithmetic operation unit that determines through arithmetic operation image-capturing conditions by using information corresponding to a central area within the second tracking zone.

According to the 11th embodiment of the present invention, in the subject tracking device according to the 10th embodiment, it is preferred that the arithmetic operation unit executes exposure calculation by using image data over a central area of the second tracking zone.

According to the 12th embodiment of the present invention, in the subject tracking device according to the 10th embodiment, it is preferred that the arithmetic operation unit includes a focus detection calculation unit that executes focus detection calculation for a focus detection area closest to a center of the second tracking zone among a plurality of focus detection areas.

According to the 13th embodiment of the present invention, in the subject tracking device according to the 1st embodiment, it is preferred that the arithmetic operation unit determines through arithmetic operation the image-capturing conditions by using an image output corresponding to an area near a central area of the tracking zone.

According to the 14th embodiment of the present invention, in the subject tracking device according to the 13th embodiment, it is preferred that there is further provided a display unit that displays a mark indicating a central area of the tracking zone.

According to the 15th embodiment of the present invention, in the subject tracking device according to the 10th embodiment, it is preferred that the arithmetic operation unit determines through arithmetic operation the image-capturing conditions by using information corresponding to an area near a central area of the second tracking zone.

According to the 16th embodiment of the present invention, in the subject tracking device according to the 15th embodiment, it is preferred that there is further provided a display unit that displays a mark indicating a central area within the second tracking zone.

According to the 17th embodiment of the present invention, a subject tracking device comprises: a tracking unit that designates image data in an area where a subject is present within a first image as a first tracking zone and tracks the subject by designating an area where image data corresponding to the image data in the first tracking zone are present in a second image obtained after the first image as a second tracking zone; and an arithmetic operation unit that determines through arithmetic operation image-capturing conditions by using at least either information corresponding to a central area within the second tracking zone or information corresponding to an area near a central area of the second tracking zone.

According to the 18th embodiment of the present invention, in the subject tracking device according to the 17th embodiment, it is preferred that the arithmetic operation unit determines through arithmetic operation the image-capturing conditions by using information indicating a higher level of contrast, selected from the information corresponding to a central area of the second tracking zone and the information corresponding to the area near a central area of the second tracking zone.

According to the 19th embodiment of the present invention, in the subject tracking device according to the 17th embodiment, it is preferred that the arithmetic operation unit determines through arithmetic operation the image-capturing conditions by weighting a central area of the second tracking zone.

According to the 20th embodiment of the present invention, a subject tracking device comprises: a tracking unit that designates image data in an area where a subject is present within a first image as a first tracking zone and tracks the subject by designating an area where image data corresponding to the image data in the first tracking zone are present in a second image obtained after the first image as a second tracking zone; and an arithmetic operation unit that determines through arithmetic operation image-capturing conditions by using information corresponding to a central area within the second tracking zone and information corresponding to a direction along which the subject moves during a period elapsing between a time point at which the first image is captured and a time point at which the second image is captured.

According to the 21st embodiment of the present invention, in the subject tracking device according to the 20th embodiment, it is preferred that the arithmetic operation unit determines through arithmetic operation the image-capturing conditions by using information corresponding to an area near a central area of the second tracking zone.

According to the 22nd embodiment of the present invention, in the subject tracking device according to the 20th embodiment, it is preferred that there is further provided a display unit that displays a mark indicating a central area within the second tracking zone.

According to the 23rd embodiment of the present invention, a subject tracking method comprises: designating image data in an area where a subject is present within a first image as a first tracking zone; tracking the subject by designating an area where image data corresponding to the image data in the first tracking zone are present in a second image obtained after the first image as a second tracking zone; and determining through arithmetic operation image-capturing conditions by using information corresponding to a central area within the second tracking zone.

According to the 24th embodiment of the present invention, in the subject tracking method according to the 23rd embodiment, it is preferred that exposure calculation is executed by using image data over a central area of the second tracking zone.

According to the 25th embodiment of the present invention, in the subject tracking method according to the 23rd embodiment, it is preferred that focus detection calculation is executed in correspondence to a focus detection area closest to a center of the second tracking zone among a plurality of focus detection areas.

According to the 26th embodiment of the present invention, in the subject tracking method according to the 23rd embodiment, it is preferred that the image-capturing conditions are determined through arithmetic operation executed by using information corresponding to an area near a central area of the second tracking zone.

According to the 27th embodiment of the present invention, in the subject tracking method according to the 23rd embodiment, it is preferred that the image-capturing conditions are determined through arithmetic operation executed by using information corresponding to a direction along which the subject moves during a period elapsing between a time point at which the first image is captured and a time point at which the second image is captured.

According to the 28th embodiment of the present invention, an optical apparatus comprises a subject tracking device according to the 1st embodiment.

DESCRIPTION OF PREFERRED EMBODIMENTS

Figure 1:
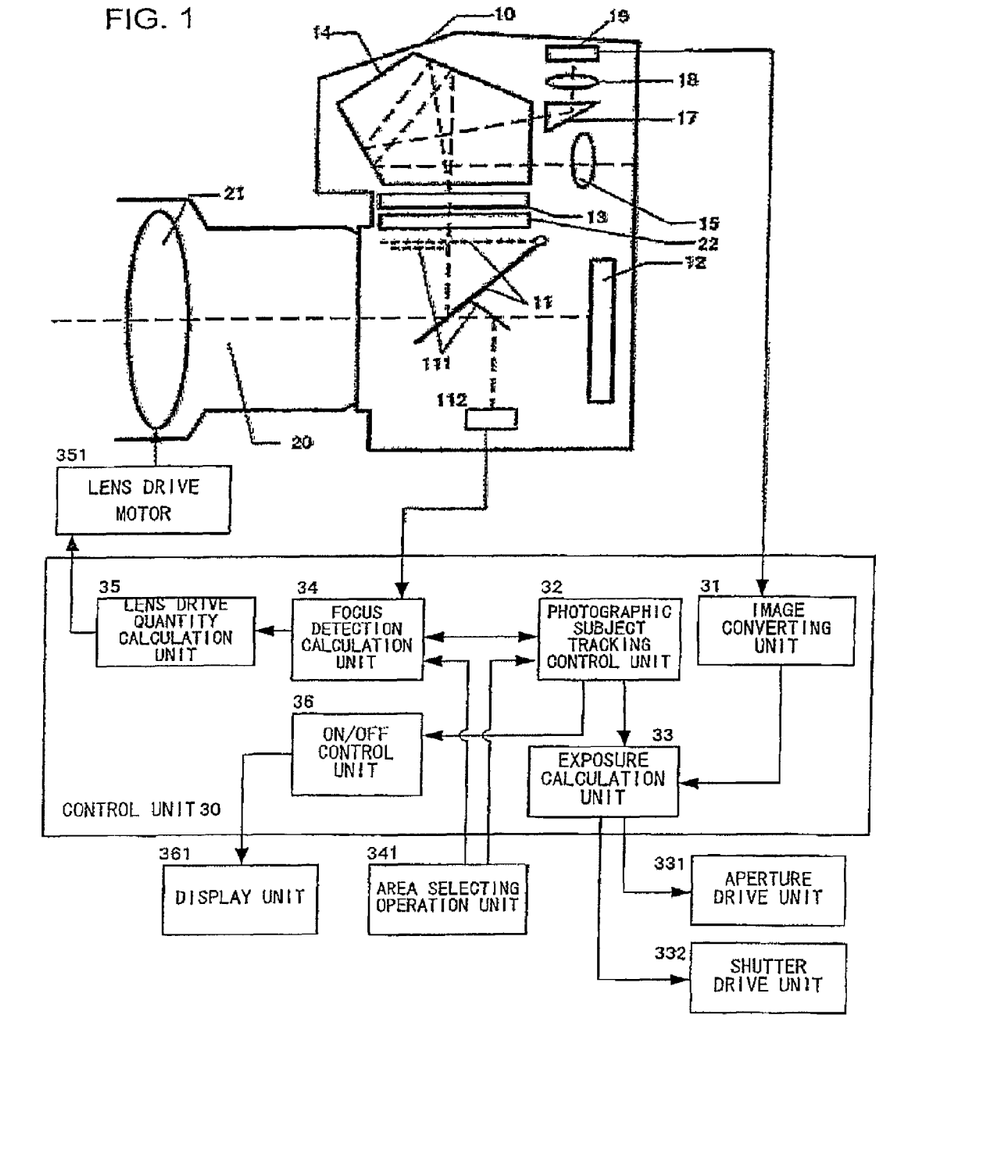
FIG. 1 illustrates the essential structure adopted in the digital camera achieved in an embodiment of the present invention.

The following is an explanation of a single lens reflex digital camera achieved in an embodiment, which is equipped with a photographic subject tracking device (or a photographic subject following device), given in reference to the drawings. FIG. 1 shows the essential structure adopted in the digital camera according to the present invention. A lens barrel 20, which includes a photographic lens 21, is exchangeably mounted at a camera body 10.

A first image sensor 12 used to capture an image of a photographic subject is installed in the camera body 10. The first image sensor 12 may be a CCD or a CMOS. A quick-return mirror 11 that reflects subject light having passed through the photographic lens 21 toward a viewfinder optical system is disposed between the photographic lens 21 and the first image sensor 12. Some of the subject light is transmitted through a semi-transmissive area of the quick return mirror 11, is reflected downward at a sub mirror ill and enters an AF sensor module 112 adopting the phase detection system.

The phase detection type AF sensor module 112 may include, for instance, a focus detection optical system that splits a focus detection light flux into a pair of focus detection optical images and a plurality of pairs of CCD line sensors that each output focus detection signals corresponding to the pair of split optical images having entered therein. The focus detection signals output from the plurality of pairs of CCD line sensors are input to a control unit 30, which, in turn, outputs a lens drive signal in response to which a focus adjustment lens is driven to the focus match position, as explained later, by using the focus detection signals output from a specific pair of CCD line sensors among the plurality of pairs of CCD line sensors.

The subject light reflected at the quick return mirror 11 forms an image on a focusing screen 13 disposed at a position optically equivalent to the position of the first image sensor 12. The subject image formed on the focusing screen 13 can be observed by the photographer via a pentaprism 14 and an eyepiece lens 15, and it also passes through a prism 17 and an image forming lens 18 from the pentaprism 14 to form an image on a light-receiving surface of a second image sensor 19. The second image sensor 19 is constituted with pixels, the number of which is smaller than the number of pixels constituting the first image sensor 12, and it may be a CCD with 640×480 pixels disposed in an RGB Bayer array. It is to be noted that when a photographic operation is executed in response to a full-press operation of a shutter release button (not shown), the quick return mirror 11 rotates to the position indicated by the dotted line in the figure to allow the subject light to form an image on the first image sensor 12.

Image data obtained at the second image sensor 19 are input to the control unit 30. The control unit 30 comprises a CPU, a ROM, a RAM and various peripheral circuits. Its functional blocks include an image converting unit 31 that converts and reduces the image data obtained at the second image sensor 19 into image data achieving a predetermined image size, e.g., a 64×48 pixels, a photographic subject tracking control unit 32 that tracks and follows a main photographic subject, an exposure calculation unit 33 that calculates the optimal exposure for the main photographic subject, a focus detection calculation unit 34 that executes focus detection calculation, a lens drive quantity calculation unit 35 that calculates a drive quantity indicating the extent to which the photographic lens 21 needs to be driven, and an ON/OFF control unit 36 that controls the ON/OFF state of an AF area mark indicating a focus detection area 40 at a display unit 361, as explained later. At the display unit 361, the AF area mark can be displayed via a liquid crystal display panel 22 disposed near the focusing screen 13.

The focus detection calculation unit 34 determines through an arithmetic operation the focus adjustment state indicated by the defocused quantity and the like based upon the focus detection signals output from the pair of CCD line sensors corresponding to the focus detection area 40 selected by the photographer by operating a focusing area selecting operation unit 341.

Figure 2:
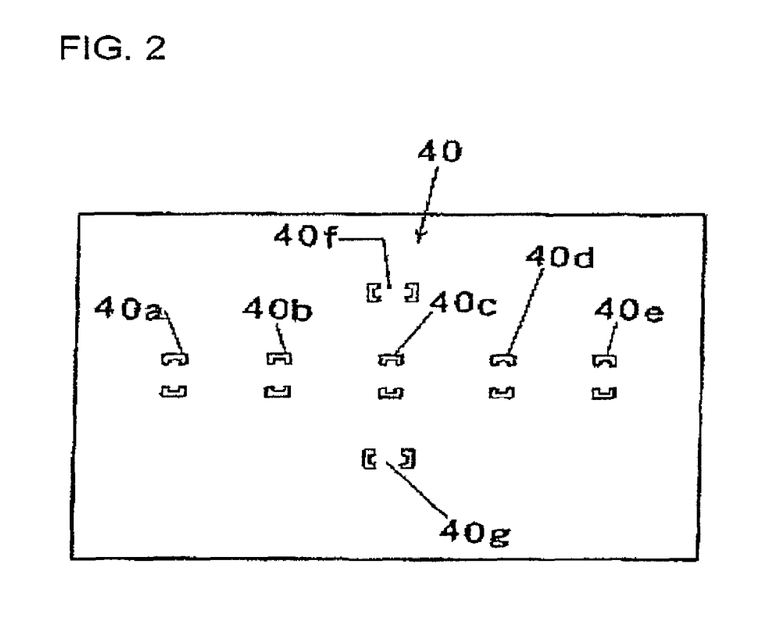
FIG. 2 shows the positions at which the focus detection areas are indicated on the viewfinder of the digital camera achieved in the embodiment.

As shown in FIG. 2, seven focus detection areas 40a~40g, for instance, may be set within the photographic field (the imaging field or the imaging-capturing field) in the camera achieved in the embodiment. As one of the seven focus detection areas 40a~40g is selected via the area selecting operation unit 341, the focus detection calculation unit 34 determines through arithmetic operation the focus adjustment state (focus adjustment quantity) in correspondence to the selected focus detection area 40. In addition, the area selecting operation unit 341 outputs a selected focus detection area signal, indicating the specific focus detection area having been selected among the seven focus detection areas 40a~40g, to the photographic subject tracking control unit 32. The focus adjustment quantity calculated in the focus detection calculation unit 34 is output to the lens drive quantity calculation unit 35. The lens drive quantity calculation unit 35 calculates the lens drive quantity based upon the focus adjustment quantity input thereto and outputs the resulting lens drive signal to a lens drive motor 351. The lens drive motor 351 drives the photographic lens 21 along the optical axis in response to the lens drive signal, thereby adjusting the focus adjustment state.

Figure 3:
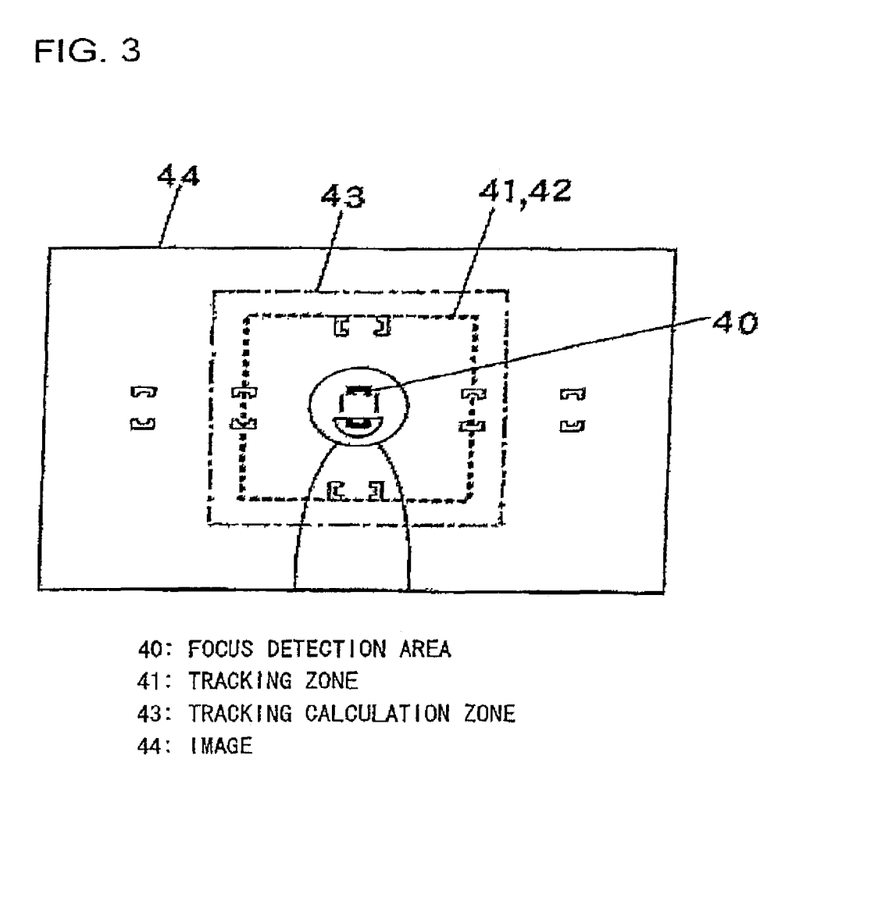
FIG. 3 is a conceptual diagram of the various areas used in the photographic subject tracking control in the embodiment.

Based upon the selected focus detection area signal input thereto, the photographic subject tracking control unit 32 extracts the image data corresponding to a tracking zone from the image data having been converted by the image converting unit 31 and executes subject tracking calculation based upon the image data in the tracking zone. In this embodiment, a tracking zone 41 and a tracking calculation zone 43 ranging over a greater area than the tracking zone 41 are set on an initial image 44 obtained via the second image sensor 19 and the tracking zone 41 is designated as a template image 42, as shown in FIG. 3. The tracking zone 41 should range over a predetermined area, e.g., a 4×4 pixel area, around the focus detection area 40 recognized based upon the selected focus detection area signal. It is to be noted that a range with a hue identical to that of the focus detection area 40 may be designated as the tracking zone 41.

Then, the photographic subject tracking control is executed by preparing a cutout area, which is equal to the template image 42 in size, within the tracking calculation zone 43 in an image obtained successively via the second image sensor 19 and by calculating the differences between the R (red), G (green) and B (blue) colors in the cutout area and the R (red), G (green) and B (blue) colors in the template image 42. It is to be noted that the size of the tracking zone 41 is selected as a default setting and that the photographer does not set the size of the tracking zone 41.

Actually, the control unit 30 utilizes in calculation the reduced image 44 (64×48 pixels), for example, into which the image (640×480 pixels) obtained by the second image sensor 19 has been converted and reduced. FIG. 3 shows the tracking calculation zone 43 (8×8 pixels, for example) over the reduced image 44 (64×48 pixels) and the tracking zone 41 (4×4 pixels, for example) over the reduced image 44 (64×48 pixels). It is to be noted that FIG. 3 presents a conceptual diagram and that the proportional relationships among the sizes of the various areas of the actual product may not match those shown in FIG. 3.

Figure 4A:
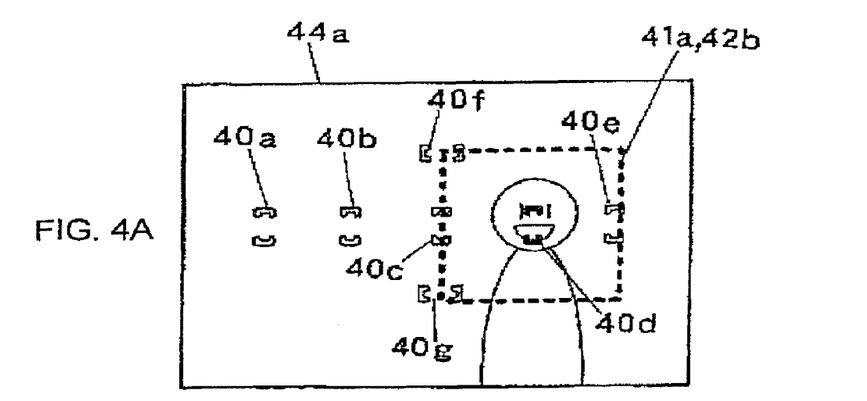
FIGS. 4A~4C illustrate the subject tracking method adopted in the embodiment.
Figure 4B:
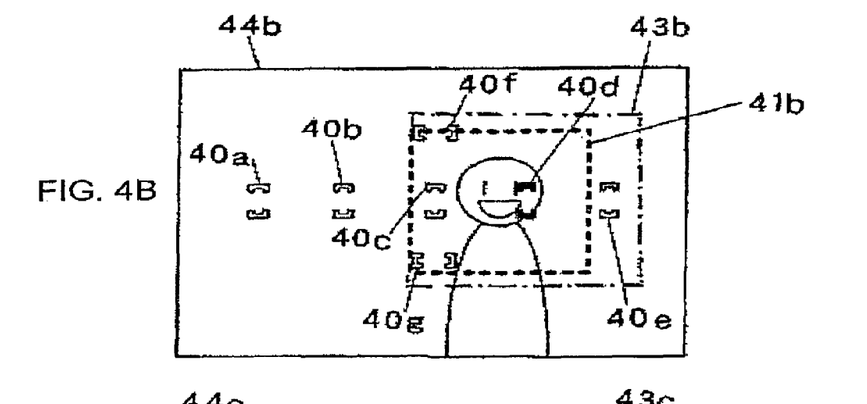
Figure 4C:
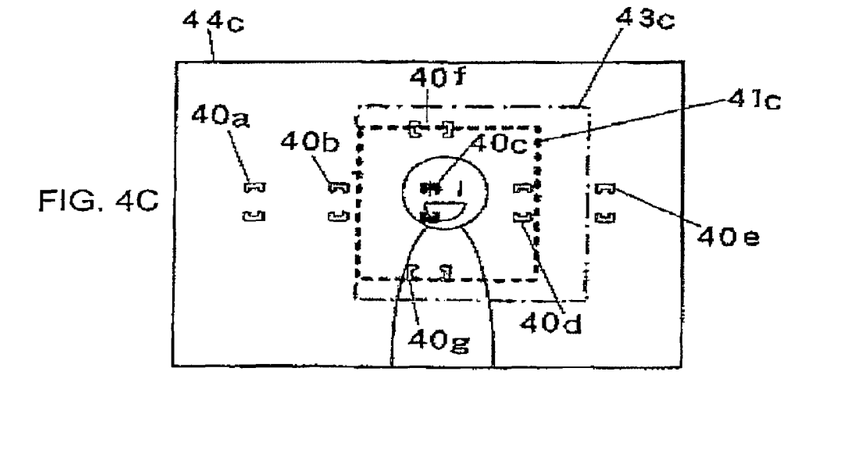

Now, the photographic subject tracking control method according to the present invention is explained in detail in reference to FIGS. 4A~4C. It is assumed that the photographer has selected the focus detection area 40d by operating the focusing area selecting operation unit 341. Under such circumstances, the photographic subject tracking control unit 32 regards a subject present at the focus detection area 40d as the main photographic subject and designates a relatively wide range containing the focus detection area 40d as a tracking zone 41a, as shown in FIG. 4A. The image data in the tracking zone 41a are stored into a predetermined storage area within the photographic subject tracking control unit 32 as the template image 42. In addition, the ON/OFF control unit 36 issues an instruction for the display unit 361 to turn on the focus detection area 40d based upon the selected focus detection area signal provided from the area selecting operation unit 341.

FIG. 43 shows an image 44b obtained in time sequence at the second image sensor 19 to follow the image 44a. The photographic subject tracking control unit 32 selects a range greater than the initial tracking zone 41a as a tracking calculation zone 43b. An area inside the tracking calculation zone 43b, which is equal in size to the tracking zone 41a, is extracted as a cutout area and the cut-out position is sequentially displaced. The differences between the R (red), G (green) and B (blue) colors in the individual cut-out areas and the R (red), G (green) and B (blue) colors in the template image 42 are calculated and the cut-out area indicating the smallest value representing the sum of the differences is judged to be the area most similar to the template image 42. This cut-out area is then designated as a new tracking zone 41b in the image 44b.

The photographic subject tracking control unit 32 outputs information indicating the range of the tracking zone 41b and the coordinates of the center of the tracking zone 41b to the focus detection calculation unit 34 and the exposure calculation unit 33. Based upon the coordinates of the tracking zone 41b input thereto, the focus detection calculation unit 34 determines that the main photographic subject is present at the focus detection area 40d closest to the center of the tracking zone 41b, and calculates the focus adjustment quantity by using the focus detection signals output from the pair of CCD line sensors corresponding to the focus detection area 40d. The focus detection calculation unit 34 outputs the selected focus detection area signal indicating the focus detection area 40d to the ON/OFF control unit 36 via the photographic subject tracking control unit 32. The display unit 361 turns on the AF area mark for the focus detection area 40d based upon the selected focus detection area signal.

The exposure calculation unit 33 extracts the image data corresponding to the central area of the tracking zone 41b from the image data provided via the image converting unit 31 based upon the coordinates of the tracking zone 41b, calculates the optimal exposure based upon the extracted image data, and outputs the calculation results to an aperture drive unit 331 and a shutter drive unit 332. Namely, the exposure calculation unit 33 executes the exposure calculation for the area corresponding to the center of the tracking zone.

FIG. 4C shows an image 44c obtained in time sequence at the second image sensor 19 to follow the image 44b. As in the case of the image 44b, the photographic subject tracking control unit 32 selects a range greater than the tracking zone 41b as a tracking calculation zone 43c. Then, through the procedure having been explained in reference to FIG. 4B, the differences between the R (red), G (green) and B (blue) colors in the individual cut-out areas and the R (red), G (green) and B (blue) colors in the template image 42 are calculated and the cut-out area indicating the smallest value representing the sum of the differences is designated as a new tracking zone 41c.

The photographic subject tracking control unit 32 outputs information indicating the range of the tracking zone 41c and the coordinates of the center of the tracking zone 41c to the focus detection calculation unit 34 and the exposure calculation unit 33. Based upon the coordinates of the tracking zone 41c input thereto, the focus detection calculation unit 34 determines that the main photographic subject is present at the focus detection area 40c closest to the center of the tracking zone 41c and calculates the focus adjustment quantity by using the focus detection signals output from the pair of CCD line sensors corresponding to the focus detection area 40c. The focus detection calculation unit 34 outputs the selected focus detection area signal indicating the new focus detection area 40c to the ON/OFF control unit 36 via the photographic subject tracking control unit 32. The display unit 361 then turns on the AF area mark for the focus detection area 40c based upon the selected focus detection area signal.

The exposure calculation unit 33 extracts the image data corresponding to the central area of the tracking zone 41c from the image data provided via the image converting unit 31 based upon the coordinates of the tracking zone 41c, calculates the optimal exposure based upon the extracted image data, and outputs the calculation results to the aperture drive unit 331 and the shutter drive unit 332.

It is to be noted that if the tracking zone 41 (41a, 41b or 41c) contains a plurality of focus detection areas 40 present over equal distances from the center of the tracking zone 41, the focus detection area 40 present along the direction from the center of the tracking zone 41 in which the subject is expected to move is selected based upon the direction in which the subject moved over the previous images obtained in sequence, i.e., based upon the movement history.

Figure 5:
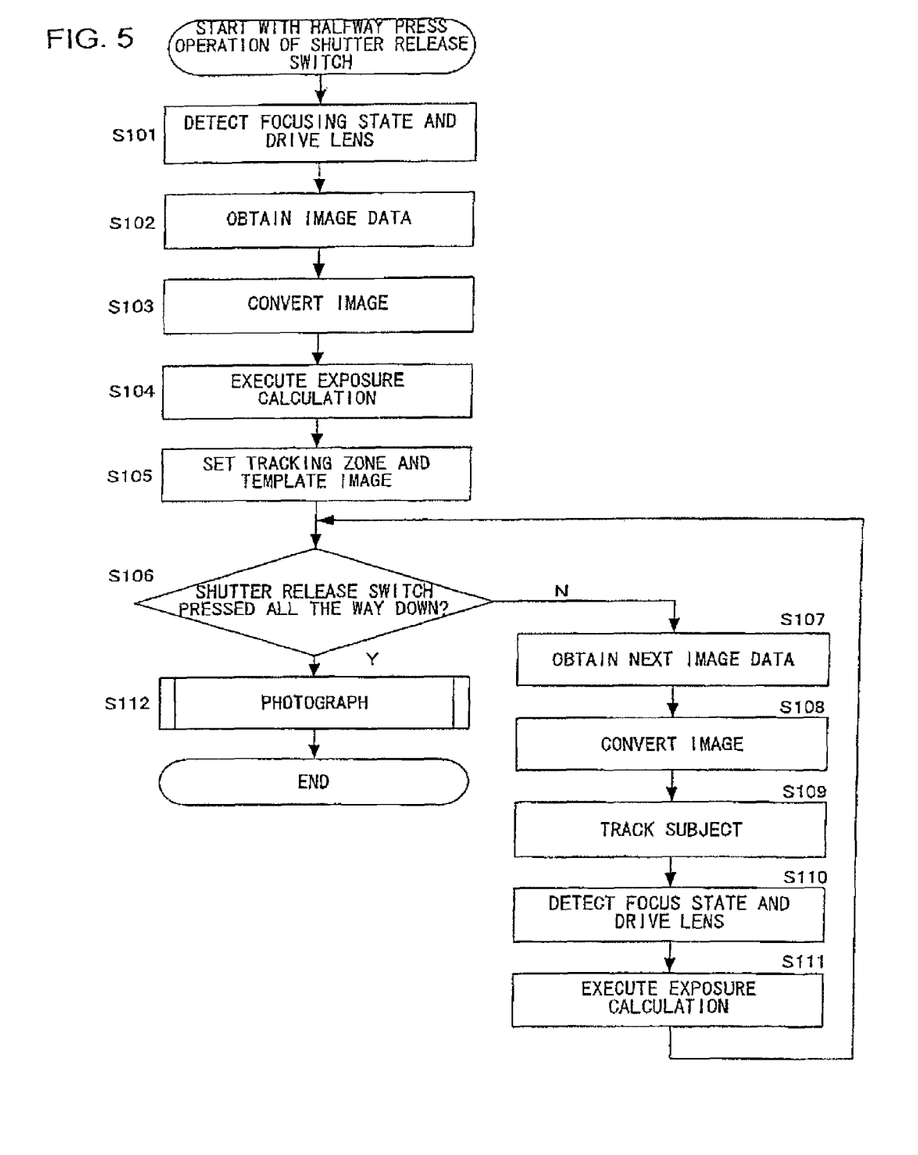
FIG. 5 presents a flowchart of the photographic subject tracking processing operation executed in the embodiment.

The following is an explanation of various phases of processing executed during the photographic subject tracking control operation, given in reference to the flowchart presented in FIG. 5. It is to be noted that the processing in the flowchart is executed by the control unit 30 in conformance to a program. In addition, the processing in the flowchart is started in response to a halfway press operation at the shutter release switch (not shown).

In step S101, focus adjustment is executed by driving the photographic lens 21 based upon the focus detection calculation results provided from the focus detection calculation unit 34 in correspondence to the focus detection area 40 having been set by the photographer, and then the operation proceeds to step S102. In step S102, the image captured at the second image sensor 19 is obtained before the operation proceeds to step S103.

In step S103, the image data having been obtained in step S102 are converted into image data of an image having a predetermined number of pixels by the image converting unit 31 and then the operation proceeds to step S104. In step S104, the exposure calculation is executed by using image data selected from the image data having been converted in step S103 in correspondence to the focus detection area for which the focus detection calculation has been executed, and then the operation proceeds to step S105.

In step S105, the tracking zone 41 is set as explained earlier based upon the focus detection area 40 having been set in step S101 and the image corresponding to the tracking zone 41 is stored as the template image 42, before the operation proceeds to step S106. In step S106, a decision is made as to whether or not the photographer has pressed the shutter release switch (not shown) all the way down. If an affirmative decision is made in step S106, i.e., if it is decided in step S106 that the shutter release switch has been pressed all the way down, the operation proceeds to step S112. If, on the other hand, a negative decision is made in step S106, i.e., if it is decided in step S106 that the shutter release switch has not been pressed all the way down, the operation proceeds to step S107.

In step S107, the next image (new image) is obtained from the second image sensor 19, and then the operation proceeds to step S108. In step S108, the obtained image is converted into an image having the predetermined number of pixels as in step S103 explained earlier, and then the operation proceeds to step S109.

In step S109, based upon the image resulting from the conversion having been executed in step S108, the differences between the R (red), G (green) and B (blue) colors in the cut-out areas and the R (red), G (green) and B (blue) colors in the template image 42 having been stored in step S105 are calculated. Based upon the calculation results, the cut-out area with the highest level of similarity is designated as the new photographic subject tracking zone 41 for the next image, before the operation proceeds to step S110.

In step S110, the selected focus detection area signal indicating the focus detection area 40 closest to the center of the tracking zone 41 having been set in step S109 is output to the focus detection calculation unit 34 to enable the focus detection calculation unit 34 to calculate the focus adjustment quantity for this focus detection area. Then the operation proceeds to step S111 to execute the exposure calculation based upon image data selected from the image data having been obtained in step S108, in correspondence to the new focus detection area 40 having been set in step S110. Subsequently, the operation returns to step S106.

If it is decided in step S106 that the shutter release switch has been pressed all the way down, the operation proceeds to step S112 as described earlier to execute a photographing operation. As the photographing operation is executed, the processing in the flowchart ends.

The following advantages are achieved with the digital camera in the embodiment explained above.

(1) A photographic subject present at the selected focus detection area 40 is designated as the tracking target subject, the tracking zone 41 is set accordingly, and the photographic subject is tracked based upon the image outputs corresponding to the tracking zone 41. In addition, the focus detection calculation is executed by using the focus detection signals corresponding to the focus detection area 40 near the center of the tracking zone 41, which is updated sequentially, and the exposure calculation is executed based upon the image output corresponding to the area around the center of the tracking zone 41 which is sequentially updated. Since the tracking zone 41 does not need to be a small area, the photographic subject can be tracked with high accuracy. In addition, since the photographing conditions (the image-capturing conditions) are determined in correspondence to the area at the center of the tracking zone 41, optimal focus adjustment for the main subject is achieved and the onus on the arithmetic processing executed to determine the photographing conditions, such as the exposure control, can be minimized.

Namely, since a greater volume of information sampled from the relatively large tracking zone 41 can be used in the tracking processing, the subject can be tracked with a high level of accuracy. Since the focus detection and the exposure calculation are executed by using the focus detection signals and the image data corresponding to the central area, which is smaller than the tracking zone 41, the position of the subject in the image plane can be ascertained with higher accuracy so as to enable photographing condition calculation such as focus adjustment and exposure control for the specific subject.

(2) The tracking zone 41 is adjusted as the main subject moves, and if the new tracking zone 41 contains a plurality of focus detection areas 40 present over equal distances from the center of the tracking zone 41, the focus detection area 40 present along the direction from the center of the tracking zone 41 in which the subject is expected to move is reset as the new focus detection area 40 based upon the direction in which the subject moved over the previous images obtained in sequence. Thus, the focus detection and the exposure calculation can be executed in correspondence to the new focus detection area 40 even when the tracking zone contains a plurality of focus detection areas 40.

The embodiment explained above allows for the following variations.

(1) While the image data corresponding to the tracking zone 41 set in the initial screen are designated as the template image 42 to be continuously compared with the subsequent images, the template image 42 may instead be updated for each subsequent image by using image data corresponding to the newly detected tracking zone 41, i.e., the nearly set tracking zone. Alternatively, a new template image 42 may be created by combining the color information corresponding to the R (red), G (green) and B (blue) colors in the template image 42 set in the initial setting screen and the color information corresponding to the R (red), G (green) and B (blue) colors in the newly set tracking zone 41. However, the sets of color information should be combined by setting a higher ratio for the color information corresponding to the template image 42 set in the initial screen in the latter case. For instance, the different sets of color information may be combined at a ratio of 4:1 for the color information corresponding to the template image 42 set in the initial screen and the color information corresponding to the newly set tracking zone 41.

Figure 6:
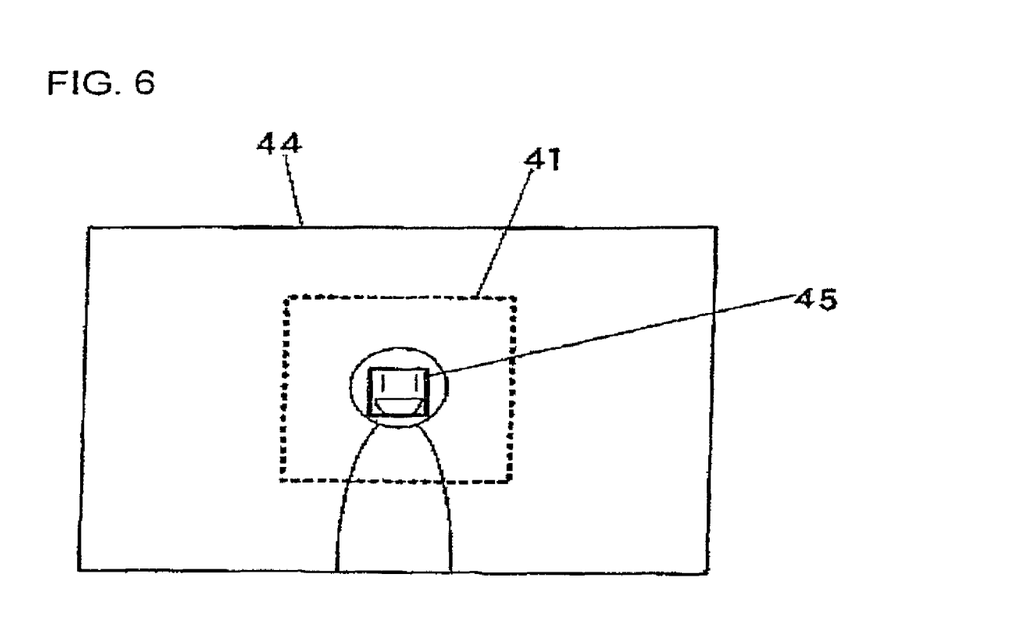
FIG. 6 shows the focus detection area set at the center of the tracking zone.

(2) While the focus detection is executed by adopting the phase detection method, the focus may instead be detected through the contrast detection method by using image data over an arbitrary area in the captured image data output from the first image sensor 12. By adopting the contrast detection method, a specific area at the center of the tracking zone 41, smaller than the tracking zone 41, can be used as the focus detection area. Under such circumstances, a rectangular or a circular frame around a small area 45 around the center of the tracking zone 41 may be displayed as shown in FIG. 6. An advantage similar to that achieved with the display unit that displays the AF area mark in the embodiment can be achieved by displaying the frame, as well.

(3) While an explanation is given above on an example in which the photographic subject tracking processing is executed based upon the image data output from the second image sensor 19, the photographic subject tracking processing may instead be executed based upon image data output from the first image sensor 12. In such a case, the image may be checked on the electronic viewfinder in a mirror-raised state, or a half-mirror (pellicle mirror) may be used to allow the optical image to be observed and captured at the same time.

(4) While an explanation is given above on an example in which the present invention is adopted in a single lens reflex digital camera that allows the use of exchangeable photographic lenses, the present invention is not limited to this example and may be adopted in a camera with an integrated lens, a camera mounted at a portable telephone or a video camera. In other words, the present invention may be adopted in all types of optical devices with photographic subject tracking functions.

Figure 7:
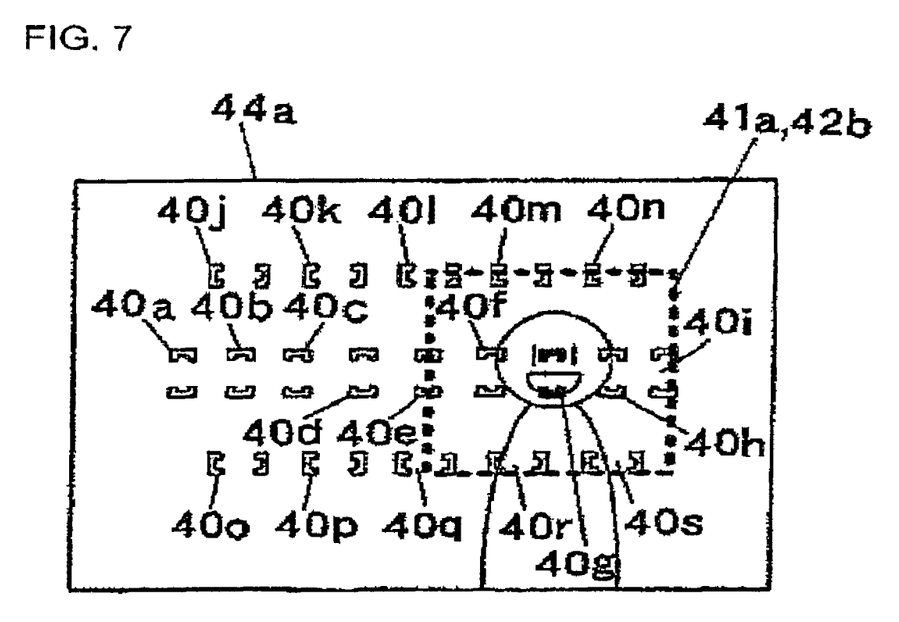
FIG. 7 shows the image screen with a great number of focus detection areas set therein.

(5) While an explanation is given above in reference to the embodiment on an example in which seven focus detection areas 40 are set, a greater number of focus detection areas 40 may be set at a higher level of density, as shown in FIG. 7. In such a case, it becomes more likely that the tracking zone 41 contains a plurality of focus detection areas. In the example presented in FIG. 7, nineteen focus detection areas 40a~40g are set. In this instance, a plurality of focus detection areas 40 are present over a region corresponding to the tracking target subject position.

Accordingly, a focus match may be achieved in correspondence to any of the focus detection areas 40f, 40h, 40m, 40n, 40r, 40s and the like present in close proximity to the center of the tracking zone 41 and the focus detection area 40g closest to the tracking zone center, by using the information obtained in the nearby focus detection areas 40f, 40h, 40m, 40n, 40r, 40s and the like as well as the information obtained over the focus detection area 40g. For instance, a focus match may be achieved by using the focus detection area information corresponding to the focus detection area achieving the highest level of contrast among the focus detection area 40g closest to the center and the nearby focus detection areas 40f, 40h, 40m, 40n, 40r and 40s. In this case, a focus match can be achieved in the area where the focus is detected with the greatest ease and the tracking target subject is likely to be present (e.g., 40f, 40h, 40r or 40s) among the nearby areas 40 even when the contrast in the focus detection area 40g is low and the focus cannot be detected with ease for the subject over the focus detection area 40g.

In case of using the nearby focus detection areas, the optimal focus detection area 40 among the focus areas including the nearby areas, where the focus match control should be executed, may be determined through arithmetic operation by weighting the focus detection area 40g closest to the center of the tracking zone 41.

(6) Even when the focus match has been achieved in one of the nearby focus detection areas 40 and the focus detection area 40g closest to the center of the tracking zone 41 as explained in (5), the focus detection area 40g closest to the center of the tracking zone 41 may still be indicated in the viewfinder image. In this case, even when the focus match control has been executed over a nearby area where an edge of the tracking target subject has been detected, the center of the tracking target subject is marked to allow the user to recognize the tracking target subject with ease.

An explanation is given in reference to the embodiment on an example in which the present invention is adopted in a digital camera with the program shown in FIG. 5 stored in the control unit 30. However, user support may need to be extended to existing users via the Internet or portable recording media in the event of a program upgrade or the like. The present invention may be adopted in software used for upgrade support as well. Namely, the present invention provides a program that enables the computer in the camera to execute processing for tracking the main photographic subject based upon the image output corresponding to the tracking zone and processing for calculating the photographing conditions based upon the image output corresponding to the central area of the tracking zone. The tracking processing and the calculation processing executed in conformance to this program respectively corresponds to step S109 and steps S110 and S111 in the flowchart presented in FIG. 5.

Figure 8:
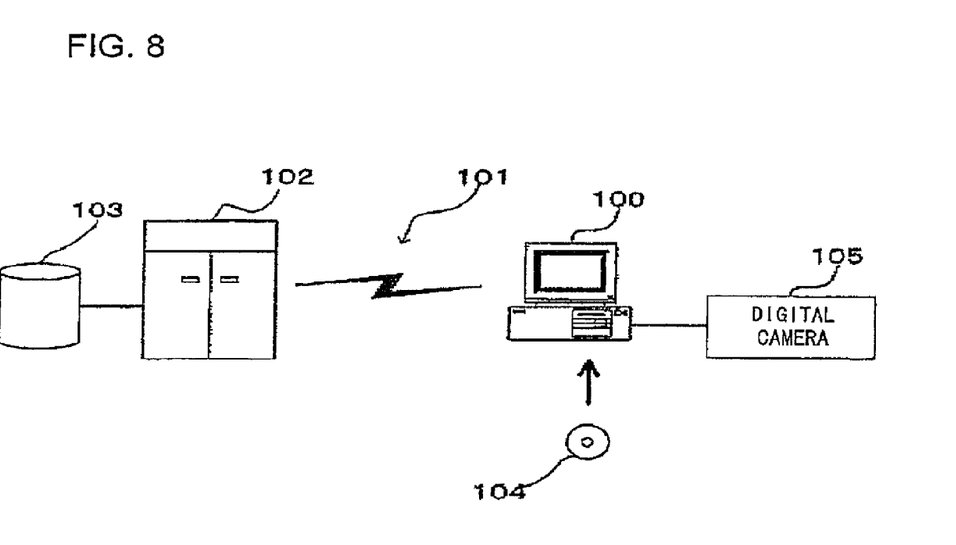
FIG. 8 shows how the program may be provided to the digital camera.

FIG. 8 shows how a personal computer having obtained the program (update program) via the Internet or via a portable recording medium, may provide the program to a digital camera. A personal computer 100 obtains the program via a recording medium 104 which may be a CD-ROM or a DVD-ROM. In addition, the personal computer 100 has a function of connecting with a communication line 101. A computer 102 is a server computer that provides the program stored in a recording medium such as a hard disk 103. The communication line 101 is a communication network such as the Internet. The computer 102 reads out the program from the hard disk 103 and transmits the program to the personal computer 100 via the communication line 101. In other words, the program, embodied as a data signal on a carrier wave, is transmitted via the communication line 101.

The personal computer 100 downloads the program thus obtained to a digital camera 105 which is connected via a cable or wirelessly connected thereto. Thus, the program to be installed in the digital camera 105 can be distributed as a computer-readable computer program product adopting any of various modes including a recording medium and a carrier wave, to allow an easy update. It is to be noted that if the digital camera 105 itself has an Internet communication function, the program may be downloaded directly to the digital camera. Alternatively, the program may be directly obtained via a recording medium such as a memory card that can be loaded into the digital camera 105.

The above described embodiments are examples, and various modifications can be made without departing from the spirit and scope of the invention.

What is claimed is:

1. A subject tracking device, comprising:
a tracking zone setting unit that initially sets an area where a main subject is present within a captured image as a tracking zone;
a tracking unit that detects a new area, where the main subject is present and which corresponds to the tracking zone set by the tracking zone setting unit, within a next captured image based upon an image output corresponding to the tracking zone, and sets the detected new area as a new tracking zone; and
an arithmetic operation unit that determines through arithmetic operation image-capturing conditions based upon an image output corresponding to a central area that is within the set new tracking zone and smaller than the set new tracking zone.

2. A subject tracking device according to claim 1, further comprising:
a converting unit that converts a captured image data to be reduced and outputs a converted image data, wherein:
the tracking unit detects the new area by using the converted image data.

3. A subject tracking device according to claim 1, wherein:
the tracking zone setting unit initially sets the area corresponding to the main subject present at a center of the captured image as the tracking zone.

4. An optical device, comprising:
a subject tracking device according to claim 1.

5. A subject tracking method, comprising:
setting initially an area where a main subject is present within a captured image as a tracking zone;
detecting a new area, where the main subject is present and which corresponds to the set tracking zone, within a next captured image based upon an image output corresponding to the set tracking zone;
setting the detected new area as a new tracking zone; and
determining through arithmetic operation image-capturing conditions based upon an image output corresponding to a central area that is within the set new tracking zone and smaller than the set new tracking zone.

6. A non-transitory computer-readable medium having contained therein a subject tracking program that enables a computer to execute a subject tracking method according to claim 5.

7. A subject tracking device, comprising:
a tracking unit that designates image data in an area where a subject is present within a first image as a first tracking zone and tracks the subject by detecting a new area where image data corresponding to the image data in the first tracking zone are present, in a second image obtained after the first image, and designating the detected new area as a second tracking zone; and
an arithmetic operation unit that determines through arithmetic operation image-capturing conditions by using information corresponding to a central area that is within the second tracking zone and smaller than the second tracking zone.

8. A subject tracking device according to claim 7, wherein:
the arithmetic operation unit executes exposure calculation by using image data over the central area of the second tracking zone.

9. A subject tracking device according to claim 7, wherein:
the arithmetic operation unit includes a focus detection calculation unit that executes focus detection through a contrast detection method by using the image data over the central area within the second tracking zone.

10. A subject tracking method, comprising:
designating image data in an area where a subject is present within a first image as a first tracking zone;
tracking the subject by detecting a new area where image data corresponding to the image data in the first tracking zone are present in a second image obtained after the first image and designating the new detected area as a second tracking zone; and
determining through arithmetic operation image-capturing conditions by using information corresponding to a central area that is within the second tracking zone and smaller than the second tracking zone.

11. A subject tracking method according to claim 10, wherein:
exposure calculation is executed by using image data over the central area of the second tracking zone.

12. A subject tracking method according to claim 10, wherein:
focus detection is executed through a contrast detection method by using image data over the central area within the second tracking zone.

13. A subject tracking device according to claim 1, further comprising:
a focus detection calculation unit that executes focus detection calculation through a phase detection method for the focus detection area closest to the center of the set new tracking zone among a plurality of focus detection areas that are provided for the phase detection method in a screen corresponding to the captured image.

14. A subject tracking device according to claim 13, further comprising:
a display unit that turns on a focus detection area closest to a center of the tracking zone among the plurality of focus detection areas.

15. A subject tracking device according to claim 1, wherein:
the tracking unit sequentially sets a plurality of equal-size areas which are each equal in size to the tracking zone within the next captured image and compares the image output corresponding to the tracking zone with an other image output corresponding to the sequentially set equal-size area, and detects an equal-size area of the plurality of equal-size areas judged to be most similar to the tracking zone as the new area.

16. A subject tracking device according to claim 7, wherein:
the tracking unit sequentially sets a plurality of equal-size areas which are each equal in size to the first tracking zone within the second image and compares the image data in the first tracking zone with image data in the plurality of equal-size areas, and detects an equal-size area of the plurality of equal-size areas judged to be most similar to the first tracking zone as the second tracking zone.

17. A subject tracking device, comprising:
an image sensor that captures an image and outputs an image capturing signal;
a plurality of focus detection areas provided at intervals at predetermined positions in the captured image;
a tracking zone setting unit that sets an area where a main subject is present within the captured image as a tracking zone;
a tracking unit that tracks the main subject using a signal of an area corresponding to the tracking zone of the image capturing signal;
a focus adjusting control unit that performs focus adjusting control using a focus detection area selected among focus detection areas included in the tracking zone; and
a display unit that displays within the captured image a mark indicating a position corresponding to the focus detection area, wherein:
the display unit displays a focus detection area closest to a center of the tracking zone of the captured image even if the focus detection area closest to the center of the tracking zone is not selected by the focus adjusting control unit.

18. A subject tracking device according to claim 17, wherein:
the focus adjusting control unit selects the focus detection area to be used for focus adjusting control while weighting a distance from the center of the tracking zone.

19. A subject tracking device according to claim 17, further comprising:
a converting unit that converts a captured image data to be reduced and outputs a converted image data, wherein
the tracking unit tracks movement of the main subject by using the converted image data.

20. A subject tracking device according to claim 17, wherein:
the tracking zone setting unit sets an area corresponding to a subject existing at a central area of the captured image as the tracking zone.

21. A subject tracking device, comprising:
an image sensor that captures an image and outputs an image capturing signal;

a plurality of focus detection areas provided at intervals at predetermined positions in the captured image;

a tracking zone setting unit that sets an area where a main subject is present within the captured image as a tracking zone;

a tracking unit that tracks the main subject based upon an image output corresponding to the tracking zone;

an exposure arithmetic operation unit that calculates exposure conditions based upon an image output corresponding to a central area within the tracking zone;

a focus detection arithmetic operation unit that calculates a focus adjustment quantity by using a focus detection signal corresponding to a focus detection area closest to a center of the tracking zone among focus detection areas existing in the tracking zone; and a display unit that displays within the captured image a mark indicating a position corresponding to the focus detection area, wherein the display unit displays within the captured image a mark indicating the focus detection area in the tracking zone.

* * * * *